US007633729B2

(12) United States Patent
Oldenburg et al.

(10) Patent No.: US 7,633,729 B2
(45) Date of Patent: Dec. 15, 2009

(54) ALTERNATING CURRENT SERIES ARC FAULT DETECTION METHOD

(75) Inventors: Wayne H. Oldenburg, Roscoe, IL (US); Donald G. Kilroy, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 232 days.

(21) Appl. No.: 11/876,004

(22) Filed: Oct. 22, 2007

(65) Prior Publication Data

US 2009/0103216 A1 Apr. 23, 2009

(51) Int. Cl.
*H02H 3/00* (2006.01)
*H02H 9/08* (2006.01)

(52) U.S. Cl. .......................................................... 361/42

(58) Field of Classification Search .................... 361/42
See application file for complete search history.

(56) References Cited

U.S. PATENT DOCUMENTS 5,561,605 A * 10/1996 Zuercher et al. .............. 702/64
5,839,092 A * 11/1998 Erger et al. ................... 702/58
6,577,138 B2 * 6/2003 Zuercher et al. ............ 324/536
7,359,168 B2 * 4/2008 Elms et al. .................... 361/42
2007/0133134 A1 6/2007 Kilroy et al.

* cited by examiner

*Primary Examiner*—Ronald W Leja
(74) *Attorney, Agent, or Firm*—Stephen G. Mican

(57) ABSTRACT

A method of detecting and indicating a presence of alternating current (AC) series arc fault events in current supplied by an AC electrical power source to an electrical load for the power source comprises the steps of: measuring positive and negative current through the load over a first sample cycle of the AC power to establish first measured positive and first measured negative current levels; determining the absolute value of the first measured positive and first measured negative current levels to establish a first absolute positive current level and a first absolute negative current level; adding the first absolute positive current level and the first absolute negative current level to establish a first sum current level; measuring positive and negative current through the load over a second sample cycle staggered from the first sample cycle to establish second measured positive and second measured negative current levels; determining the absolute value of the second measured positive and second measured negative current levels to establish a second absolute positive current level and a second absolute negative current level; adding the second absolute positive current level and the second absolute negative current level to establish a second sum current level; subtracting the second sum current level from the first sum current level to establish a current difference level; and indicating a series arc fault event if the current difference level exceeds a predetermined threshold level.

24 Claims, 3 Drawing Sheets

Start Series AF Process
Measure 1st sample pos. and neg. currents
Detect abs. value of measured 1st pos. and neg. currents
Add 1st pos. abs. and neg. abs. currents for first sum current
Measure staggered 2nd sample pos. and neg. currents
Detect abs. value of measured 2nd pos. and neg. currents
Add 2nd pos. abs. and neg. abs. currents for second sum current
Subtract the 2nd sum current from the 1st sum current for current difference
Indicate series AF if current difference exceeds threshold
Return to Start Series AF Process

ALTERNATING CURRENT SERIES ARC FAULT DETECTION METHOD

FIELD OF THE INVENTION

The invention relates to identification of electrical arc faults and, more particularly, to methodology for identifying the occurrence of alternating current (AC) arcing events.

BACKGROUND OF THE INVENTION

Conventional electrical systems that utilise electrical switching, wiring and related interconnections may degrade with time, temperature, moisture, vibration, or other environmental conditions. Such degradation may result in electrical arcing events that increase an operating temperature of the electrical system and, in extreme conditions, lead to fire.

Arcing faults mainly occur in one of two ways, series arcing faults or parallel arcing faults. A series arc can occur due to an unintentional break in an electrical system conduction path for its load. A series arc is load limited because the arc current cannot be greater than the current that the conduction path provides to its load. Conduction path current that experiences series arcing has a lower root mean square (rms) value than current without such series arcing due to extinction and re-ignition.

Parallel arcing faults either occur because of an electrical system conduction path that experiences a short circuit or a ground fault. The only limit for the current flow of a parallel arc is due to the electrical system impedance and the impedance of the fault itself. The rms current value for parallel arc faults may be considerably less than that of a solid fault so that ordinary circuit breaker systems may not detect such faults before a they create a fire.

Such electrical arcing, whether series or parallel, may be inherently low impedance and occur infrequently. Such infrequent occurrence may prevent a thermal circuit breaker from reaching its predetermined temperature trip level or a solid-state power controller (SSPC) from reaching its predetermined energy trip rating. As a result, conventional thermal circuit breakers and SSPCs typically do not trip when such electrical arcing occurs, even though it is desirable to detect electrical arc events for purposes such as identifying an electrical problem and preventing the problem from causing serious damage or hazards.

Electrical arc detection hardware is available for electrical arc detection. Such hardware may couple to a thermal circuit breaker to detect an AC electrical arc and initiate a trip of the breaker. Likewise, such hardware may couple to a SSPC to detect an AC electric arc and initiate a trip of the SSPC. However, such electrical arc detection increases the size, weight and cost of the electrical system.

U.S. Ser. No. 11/297,862 to Oldenburg et al., owned by the assignee of this application and hereby incorporated into this application by reference, describes one effective solution for detecting electrical arc faults of both the series and parallel type that is suitable for incorporating into an SSPC with no additional hardware.

Such electrical arc fault detection solutions typically compare a sample of the current with a previous sample to determine if arcing differences and characteristics exist. For maximum response, the comparison is usually on a half AC cycle basis. Certain AC loads, typically those that comprise electrical rectification, switching, and other non-linear functions may cause a direct current (DC) offset in the load current. A small DC offset in the AC load current is insignificant with respect to the overall load at the power source level, but it may be significant at a lower distribution level.

The DC offset results in making the AC load current appear asymmetrical. Arc fault detection solutions typically rely on sampled current to determine if arcing is occurring. Samples of the asymmetrical current can, under the right circumstances, make such arc fault detection solutions detect and nuisance trip on these current samples.

SUMMARY OF THE INVENTION

The invention generally comprises a method of detecting and indicating a presence of alternating current (AC) series arc fault events in current supplied by an AC electrical power source to an electrical load for the power source, comprising the steps of: measuring positive and negative current through the load over a first sample cycle of the AC power to establish first measured positive and first measured negative current levels; determining the absolute value of the first measured positive and first measured negative current levels to establish a first absolute positive current level and a first absolute negative current level; adding the first absolute positive current level and the first absolute negative current level to establish a first sum current level; measuring positive and negative current through the load over a second sample cycle of the AC power staggered the first sample cycle to establish second measured positive and second measured negative current levels; determining the absolute value of the second measured positive and second measured negative current levels to establish a second absolute positive current level and a second absolute negative current level; adding the second absolute positive current level and the second absolute negative current level to establish a second sum current level; subtracting the second sum current level from the first sum current level to establish a current difference level; and indicating a series arc fault event if the current difference level exceeds a predetermined threshold level.

DETAILED DESCRIPTION OF THE INVENTION

Figure 1:
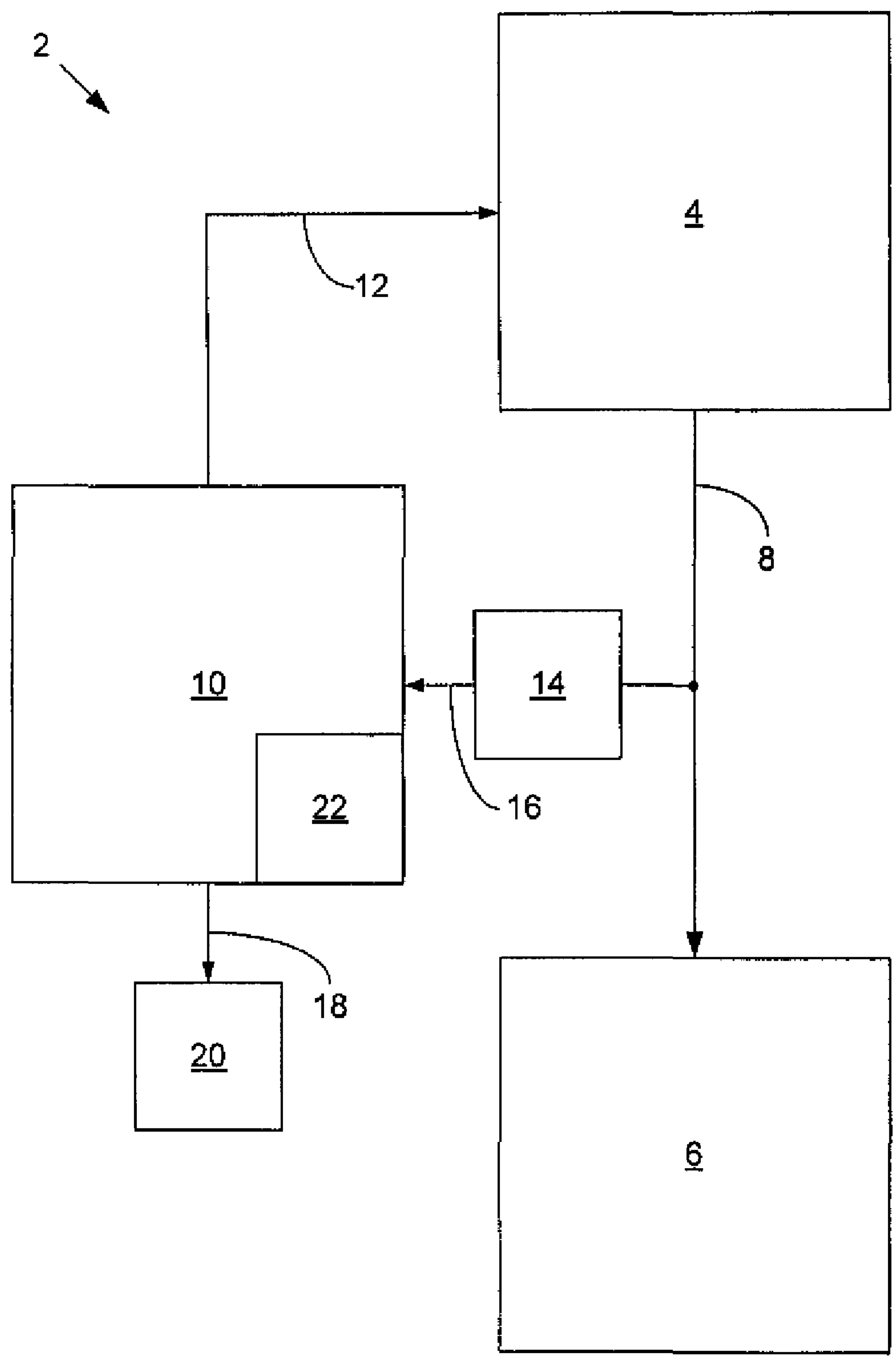
FIG. 1 is a high-level schematic diagram of an alternating current (AC) electrical system that is configurable for a possible embodiment of the invention.
Figure 2:
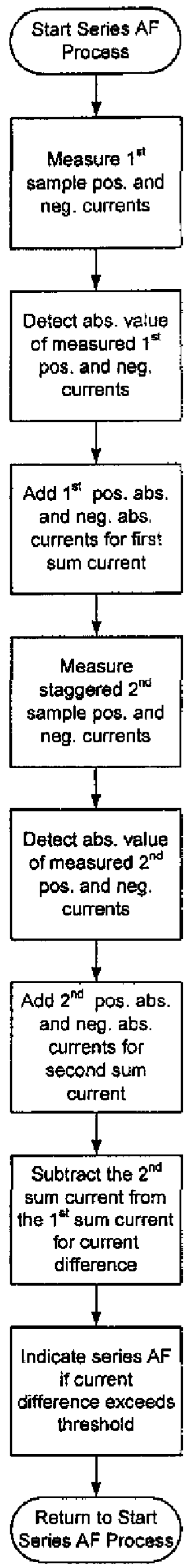
FIG. 2 is a flow chart that represents a method of detecting and indicating a presence of alternating current (AC) series arc fault events in an electrical system according to a possible embodiment of the invention.

FIG. 1 is a high-level schematic diagram of an alternating current (AC) electrical system 2 that is configurable for a possible embodiment of the invention. The electrical system 2 comprises an AC source 4 that powers an AC electrical load 6 by means of an AC power bus 8. Any sort of break or loose connection between the AC source 4 and the AC power bus 8, between the AC load 6 and the AC power bus 8 or within the AC power bus 8 itself may result in one or more AC series arc fault events. An electrical system control unit 10 that controls distribution of power from the AC source 4 by means of a control bus 12 may measure current in the AC power bus 8 to detect arc fault events between the AC source 4 and the electrical load 6, such as by means of an AC bus current signal generated by a current sensor 14 that it receives on a current signal feedback line 16.

Figure 3:
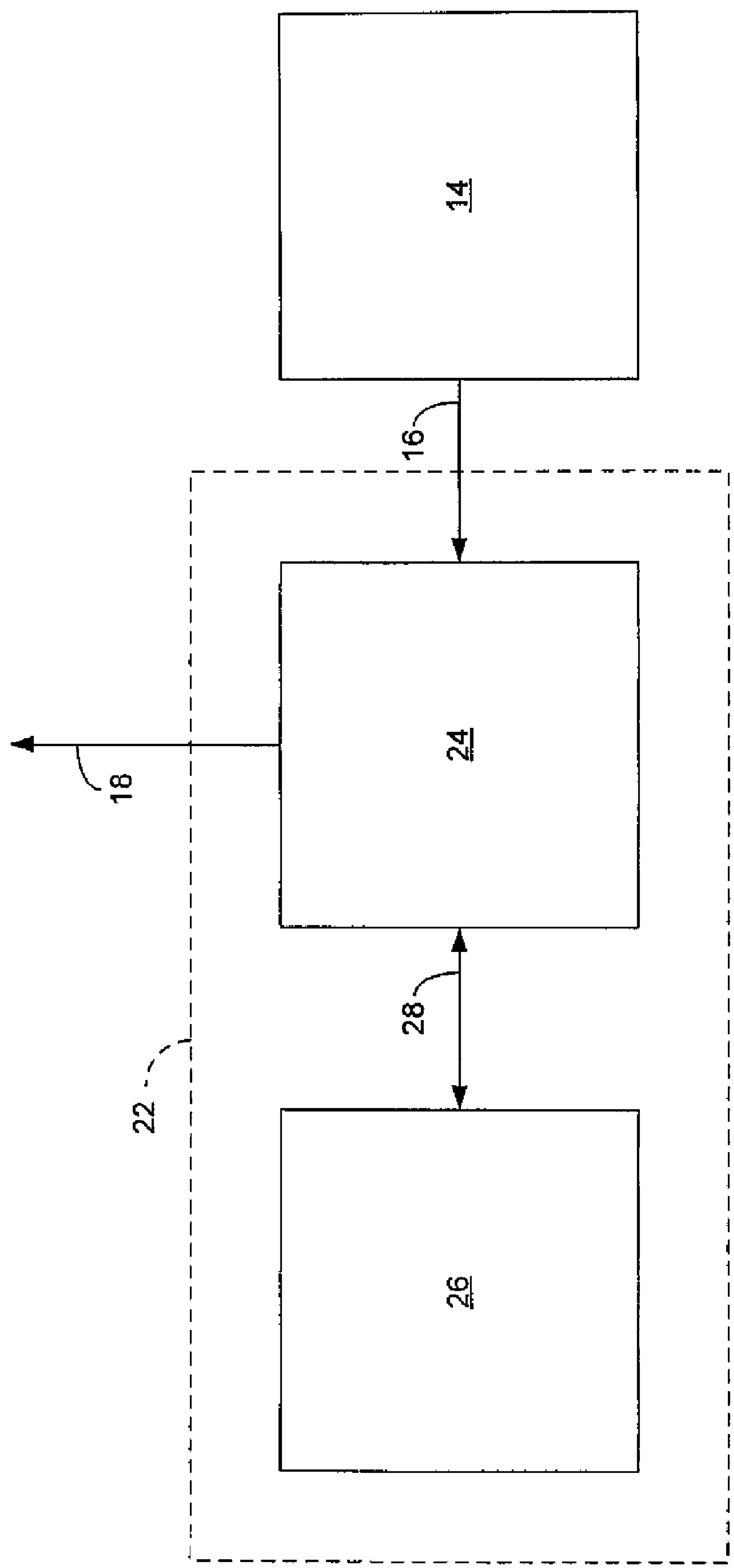
FIG. 3 is a high-level schematic diagram of a data processing system for implementing a method for detecting and indicating series AC arc fault events according to a possible embodiment of the invention.

FIG. 3 is a flow chart that represents a method of detecting and indicating a presence of alternating current (AC) series arc fault events in the electrical system 2 according to a possible embodiment of the invention. This process starts with the system control unit 10 measuring the AC positive and negative current through the electrical load 6 over a first sample cycle of the AC power by means of the AC bus current signal generated by the current sensor 14 to establish first measured positive and first measured negative current levels. The system control unit 10 then determines the absolute value of the first measured positive and first measured negative current levels to establish a first absolute positive current level and a first absolute negative current level. The system control unit 10 then adds the first absolute positive current level and the first absolute negative current level to establish a first sum current level.

The system control unit 10 then measures the AC positive and negative current through the electrical load 6 over a second sample cycle of the AC power staggered by means of the AC bus current signal generated by the current sensor 14 to establish second measured positive and second measured negative current levels. The second sample cycle may have a one half AC cycle or a full AC cycle stagger from the first sample cycle. The system control unit 10 then determines the absolute value of the second measured positive and second measured negative current levels to establish a second absolute positive current level and a second absolute negative current level. The system control unit 10 then adds the second absolute positive current level and the second absolute negative current level to establish a second sum current level.

The system control unit 10 then subtracts the second sum current level from the first sum current level to establish a current difference level. The system control unit 10 then indicates a series arc fault event if the current difference level exceeds a predetermined threshold level. The system control unit 10 may indicate such a series arc fault by means of an arc fault signal that it generates on an arc fault signal line 18. An arc fault indicator 20 may receive the arc fault signal on the arc fault signal line 18 to display series arc fault events. The system control unit 10 then repeats this series arc fault detection and indication process with additional first and second samples as hereinbefore described.

The system control unit 10 may also alter the distribution of power from the AC source 4 by means of the control bus 12 in response to such series arc fault events, such as by interrupting power to the electrical load 6 by means of the AC power bus 8. Furthermore, the system control unit 10 may delay series arc fault indication or protection to a predetermined number of such series arc fault events, such as five consecutive events, within a predetermined period.

By measuring first and second samples staggered by at least one half AC cycle, the process incorporates a rolling sample technique that cancels out the effective DC offset current. In the case of a half AC cycle stagger, the technique combines the current positive half cycle and current negative half cycle current samples and compares them with the combination of the previous negative half cycle and the current positive half cycle. Likewise, the next sample combines the next positive half cycle and current negative half cycle current samples and compares them with the combination of the current negative half cycle and the current positive half cycle. The rolling samples continue on half cycle after half cycle. Alternatively, in the case of a full AC cycle stagger, the process may evaluate a full AC cycle against the previous full AC cycle. By keeping the combination of a positive half cycle and a negative half cycle rolling every half cycle or every full cycle, the process maintains maximum response time and it avoids nuisance indication or tripping due to the effects of DC offset current.

The system control unit 10 may comprise a data processing system 22 for implementing the hereinbefore described process. FIG. 3 is a high-level schematic diagram of a data processing system 22 for implementing the hereinbefore described process for detecting and indicating series AC arc fault events. The data processing system 22 may comprise a central processing unit (CPU) 24 coupled to a memory unit 26 by way of a two-way data bus 28. The memory unit 26 may comprise any sort of computer or CPU-readable media for storing instructions for carrying out the hereinbefore described process for detecting and indicating series AC arc fault events, such as read-only memory (ROM), random-access memory (RAM), electrically erasable programmable read-only memory (EEPROM), flash memory, optical media such as any sort of optical data storage disc or magnetic media such as any sort of magnetic storage disc. Alternatively, the data processing system 22 may comprise an application-specific integrated circuit (ASIC) that comprises such CPU 24 and memory unit 26 functionality. Implementing instructions stored in the memory unit 26, the CPU 24 executes the hereinbefore described process for detecting and indicating series AC arc fault events in response to AC bus current signal generated by the current sensor 14 to generate the arc fault signal on the arc fault signal line 18 whenever the current difference level exceeds the predetermined threshold level.

The described embodiments of the invention are only some illustrative implementations of the invention wherein changes and substitutions of the various parts and arrangement thereof are within the scope of the invention as set forth in the attached claims.

The invention claimed is:

1. A method of detecting and indicating a presence of alternating current (AC) series arc fault events in current supplied by an AC electrical power source to an electrical load for the power source, comprising the steps of:

measuring positive and negative current through the load over a first sample cycle of the AC power to establish first measured positive and first measured negative current levels;

determining the absolute value of the first measured positive and first measured negative current levels to establish a first absolute positive current level and a first absolute negative current level;

adding the first absolute positive current level and the first absolute negative current level to establish a first sum current level;

measuring positive and negative current through the load over a second sample cycle of the AC power staggered from the first sample cycle to establish second measured positive and second measured negative current levels;

determining the absolute value of the second measured positive and second measured negative current levels to establish a second absolute positive current level and a second absolute negative current level;

adding the second absolute positive current level and the second absolute negative current level to establish a second sum current level;

subtracting the second sum current level from the first sum current level to establish a current difference level; and indicating a series arc fault event if the current difference level exceeds a predetermined threshold level.

2. The method of claim 1, wherein the second sample cycle is staggered by one half cycle of the AC power after the beginning of the first sample cycle.

3. The method of claim 2, wherein the method repeats in consecutive AC half cycles to detect and indicate consecutive series arc fault events.

4. The method of claim 1, wherein the second sample cycle is staggered by a full cycle of the AC power after the beginning of the first sample cycle.

5. The method of claim 4, wherein the method repeats in consecutive AC full cycles to detect and indicate consecutive series arc fault events.

6. The method of claim 1, wherein the indicating step comprises the step of interrupting power supplied by the power source to the load if the current difference level exceeds a predetermined threshold level.

7. The method of claim 1, wherein the indicating step comprises delaying indication of a series arc fault event until at least a predetermined number of current difference levels exceed the predetermined threshold level within a predetermined period.

8. The method of claim 1, wherein the indicating step comprises delaying protection of a series arc fault event until at least a predetermined number of current difference levels exceed the predetermined threshold level within a predetermined period.

9. Computer-readable media for storing instructions to detect and indicate a presence of alternating current (AC) series arc fault events in current supplied by an AC electrical power source to an electrical load for the power source, comprising:

instructions to measure positive and negative current through the load over a first sample cycle of the AC power to establish first measured positive and first measured negative current levels;

instructions to determine the absolute value of the first measured positive and first measured negative current levels to establish a first absolute positive current level and a first absolute negative current level;

instructions to add the first absolute positive current level and the first absolute negative current level to establish a first sum current level;

instructions to measure positive and negative current through the load over a second sample cycle of the AC power staggered from the first sample cycle to establish second measured positive and second measured negative current levels;

instructions to determine the absolute value of the second measured positive and second measured negative current levels to establish a second absolute positive current level and a second absolute negative current level;

instructions to add the second absolute positive current level and the second absolute negative current level to establish a second sum current level;

instructions to subtract the second sum current level from the first sum current level to establish a current difference level; and instructions to indicate a series arc fault event if the current difference level exceeds a predetermined threshold level.

10. The computer-readable media of claim 9, wherein the instructions to measure positive and negative current through the load over a second sample cycle comprises instructions to stagger the sample by one half cycle of the AC power after the beginning of the first sample cycle.

11. The computer-readable media of claim 10, wherein the instructions repeat in consecutive AC half cycles to detect and indicate consecutive series arc fault events.

12. The computer-readable media of claim 9, wherein the instructions to measure positive and negative current through the load over a second sample cycle comprises instructions to stagger the sample by one full cycle of the AC power after the beginning of the first sample cycle.

13. The computer-readable media of claim 12, wherein the instructions repeat in consecutive AC full cycles to detect and indicate consecutive series arc fault events.

14. The computer-readable media of claim 9, wherein the instructions indicate a series arc fault event comprise instructions to interrupt power supplied by the power source to the load if the current difference level exceeds a predetermined threshold level.

15. The computer-readable media of claim 9, wherein the instructions to indicate a series arc fault event comprise instructions to delay indication of a series arc fault event until at least a predetermined number of consecutive current difference levels exceed the predetermined threshold level within a predetermined period.

16. The computer-readable media of claim 9, wherein the instructions to indicate a series arc fault event comprise instructions to delay protection of a series arc fault event until at least a predetermined number of consecutive current difference levels exceed the predetermined threshold level within a predetermined period.

17. An electrical system comprising:

an electrical alternating current (AC) load;

an electrical AC power source;

an electrical AC power bus for coupling power from the source to the load; and a system control unit for controlling the electrical system that detects and indicates a presence of alternating current (AC) series arc fault events in current supplied by the power source to the load;

wherein the system control unit:

measures positive and negative current through the load over a first sample cycle of the AC power to establish first measured positive and first measured negative current levels;

determines the absolute value of the first measured positive and first measured negative current levels to establish a first absolute positive current level and a first absolute negative current level;

adds the first absolute positive current level and the first absolute negative current level to establish a first sum current level;

measures positive and negative current through the load over a second sample cycle of the AC power staggered from the first sample cycle to establish second measured positive and second measured negative current levels;

determines the absolute value of the second measured positive and second measured negative current levels to establish a second absolute positive current level and a second absolute negative current level;

adds the second absolute positive current level and the second absolute negative current level to establish a second sum current level;

subtracts the second sum current level from the first sum current level to establish a current difference level; and indicates a series arc fault event if the current difference level exceeds a predetermined threshold level.

18. The system of claim 17, wherein the second sample cycle is staggered by one half cycle of the AC power after the beginning of the first sample cycle.

19. The system of claim 18, wherein the system control unit repeats samples in consecutive AC half cycles to detect and indicate consecutive series arc fault events.

20. The system of claim 17, wherein the second sample cycle is staggered by a full cycle of the AC power after the beginning of the first sample cycle.

21. The system of claim 20, wherein the system control unit repeats samples in consecutive AC full cycles to detect and indicate consecutive series arc fault events.

22. The system of claim 17, wherein the system control unit interrupts power supplied by the power source to the load if the current difference level exceeds a predetermined threshold level.

23. The system of claim 17, wherein the system control unit delays indication of a series arc fault event until at least a predetermined number of consecutive current difference levels exceed the predetermined threshold level within a predetermined period.

24. The system of claim 17, wherein the system control unit delays protection of a series arc fault event until at least a predetermined number of consecutive current difference levels exceed the predetermined threshold level within a predetermined period.

* * * * *